Figure 1:
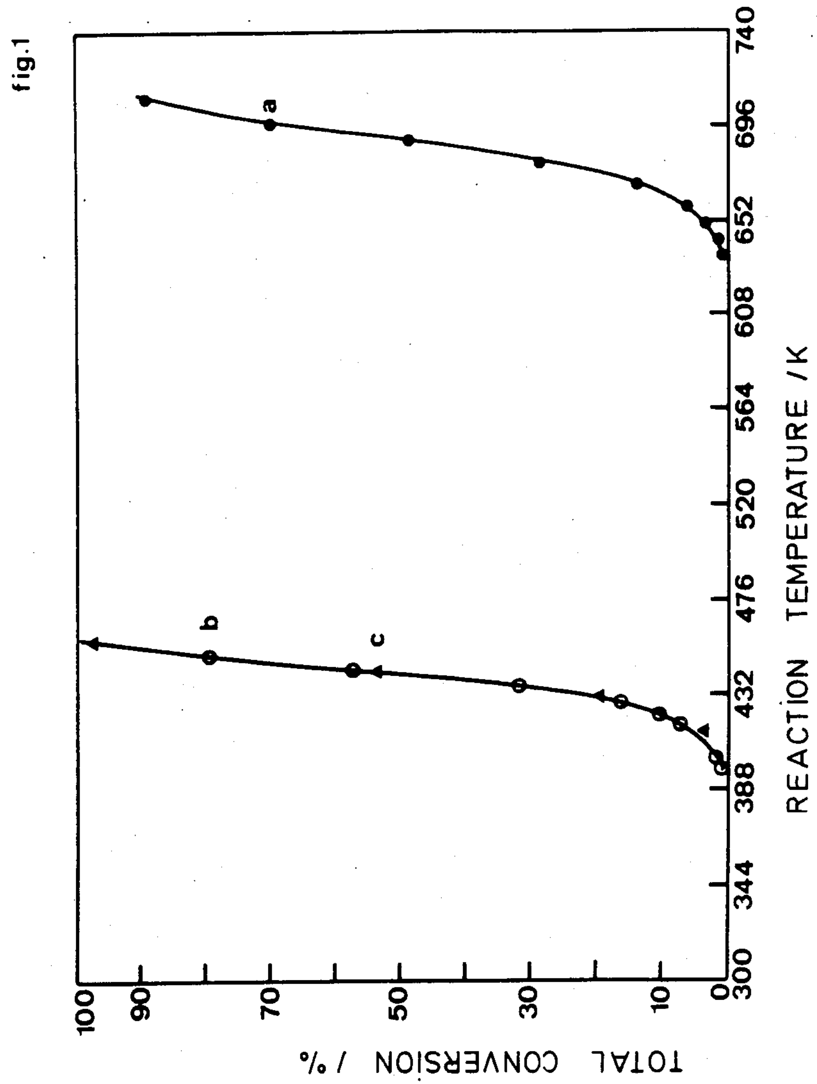

United States Patent [19]

Jacobs et al.

[11] Patent Number: 4,656,149

[45] Date of Patent: Apr. 7, 1987

[54] PROCESS FOR THE ACTIVATION OF SILICEOUS CATALYSTS

[75] Inventors: Pierre A. Jacobs, Gooik; Mia Tielen, Lubbeek; Jan B. Uytterhoeven, Louvain, all of Belgium

[73] Assignee: Katholieke Universiteit Leuven, Belgium

[21] Appl. No.: 792,403

[22] Filed: Oct. 29, 1985

[30] Foreign Application Priority Data

Oct. 29, 1984 [LU] Luxembourg .......................... 85614

[51] Int. Cl.$^{4}$ ........................ B01J 20/18; B01J 29/28; B01J 37/22

[52] U.S. Cl. ........................................ 502/35; 502/85; 502/158; 502/232

[58] Field of Search ........................ 502/71, 77, 78, 85, 502/35, 232, 158

[56] References Cited

U.S. PATENT DOCUMENTS 3,375,064 3/1968 Miale et al. .......................... 502/78
3,630,965 12/1971 Voorhies et al. .................... 502/79
4,427,786 3/1982 Miale et al. .......................... 502/61
4,438,215 3/1984 Dessau et al. ........................ 502/71
4,444,900 4/1984 Chang et al. ......................... 502/71
4,461,845 7/1984 Dessau et al. ........................ 502/35

*Primary Examiner*—Carl F. Dees
*Attorney, Agent, or Firm*—Sughrue, Mion, Zinn, Macpeak, and Seas

[57] ABSTRACT

The present invention relates to a process for the activation of siliceous catalysts selected among zeolites with a high silica content, organosilicates, polymorphous crystalline silicas and zeolites deactivated by treatment with water vapor.

According to the invention, the catalyst is activated by reacting aluminum chloride and hydrogen chloride, both in gaseous phase with the catalyst, at a temperature between about 150° and 600° C. in the same reactor, the possible excess of gaseous hydrogen chloride being removed by means of an inert gas, such as nitrogen.

8 Claims, 7 Drawing Figures a
b
c
TOTAL CONVERSION / %
100
90
70
50
30
10
0
REACTION TEMPERATURE /K
300
344
388
432
476
520
564
608
652
696
740

REACTION TEMPERATURE / K
300
344
388
432
476
520
564
608
652
696
740
100
90
70
50
0
% ISOMERIZATION
a
b
c

% HYDROCRACKING
100
90
70
50
30
10
0
300
344
388
432
476
520
564
608
652
696
740
REACTION TEMPERATURE / K
a
b
c

TOTAL CONVERSION /%
REACTION TEMPERATURE /K
100
90
70
50
30
10
0
300
344
388
432
476
520
564
608
652
696
740
a
b
c
d a
b
c
300
344
388
432
476
520
564
608
652
696
REACTION TEMPERATURE /K
TOTAL CONVERSION / %

PROCESS FOR THE ACTIVATION OF SILICEOUS CATALYSTS

PRIOR ART

It is known that catalysts of the zeolite type with a high silica content, which are deactivated by the dealuminification of their frame, can be reactivated by the re-aluminification of the siliceous matrix.

It is generally admitted that the ionic exchange capacity of a crystalline zeolite depends directly on its aluminum content. If the cations necessary to counterbalance the electronegativity of the zeolite are protons, they confer a remarkable catalytic activity on the zeolite. Moreover, zeolites with a high silica content containing almost no aluminum possess numerous significant properties and characteristics and a high degree of structural stability, so that they can be used in various catalytic processes.

As examples of such zeolites with a high silica content the following, among others, can be cited:

ZSM-5 and ZSM-11 (U.S. Pat. No. 3,709,979)
ZSM-12 (U.S. Pat. No. 3,832,449)
ZSM-48 (European Pat. No. 23,089)
organosilicates free of aluminum with the structure of ZSM-5 (U.S. Pat. No. 3,941,871)
microporous crystalline silicas or organosilicates containing traces of aluminum (U.S. Pat. Nos. 4,061,724, 4,073,865 and 4,104,294).
AMS-1B borosilicates (U.S. Pat. No. 4,269,813).

Several processes have recently been proposed to increase the activity of these zeolites or crystalline silicates with a low alumina content.

Thus, in U.S. Pat. No. 4,427,786, a process was proposed to increase the activity of a crystalline zeolite with a ratio of silica:alumina of more than 100; in this process, the zeolite synthesized from a reacting mixture containing voluminous ions is treated in the following way:

calcination of the zeolite at a temperature between 200° and 600° C.;
placing the calcined zeolite in contact with dry boron fluoride at a temperature of 0° to 100° C. until saturation;
elimination of the excess of boron fluoride from the zeolite by purging;
hydrolysis of the adsorbed boron fluoride with a solution of an ammonium salt to obtain the supported zeolite, and
re-calcination of the supported zeolite.

Moreover, U.S. Pat. No. 4,438,215 describes a process to increase the catalytic activity of the same zeolites synthesized from a reacting mixture containing tetraalkylammonium ions; this process consists in:

calcining the synthesized zeolite at a temperature between 200° and 600° C.;
treating the calcined zeolite with aluminum chloride at a temperature of 100° to 600° C.;
hydrolyzing the aluminum chloride adsorbed on the crystalline material with water;
calcining the crystalline material for the purpose of obtaining an improved catalytic activity.

Finally, U.S. Pat. No. 4,444,900 describes a process to increase the catalytic activity of a synthetic porous crystalline zeolite with a ratio of silica:alumina of more than 100, this zeolite having been synthesized in diamine as the source of cations. This process comprises the following phases:

reaction of the synthesized zeolite with a diluted solution 0.1 to 5N of hydrofluoric acid at a temperature of 0° to 30° C. for less than 60 minutes;
placement of the zeolite treated with the hydrofluoric acid in contact with aluminum chloride at a temperature between 100° and 850° C.;
treatment of the zeolite placed in contact with aluminum chloride with a solution of an ammonium salt;
calcination of the obtained material.

The processes known to improve the catalytic activity of zeolites, summarized above, require multiple phases consisting particularly of calcination treatments and reactions in a liquid phase.

BRIEF DESCRIPTION OF THE INVENTION

This invention relates to a process for the activation of catalysts of the types mentioned above, which can be carried out in a single reactor and in which the activation is performed with inexpensive reagents in a gaseous phase.

It should be noted that the isomerization and the hydrocracking of n-paraffins, in particular n-decane, by a bifunctional mechanism, have been studied on zeolites with high molar ratios $SiO_2/Al_2O_3$ (J. Martens, J. Weitkamp, M. Tielen, P. Jacobs, Zeolites 4, 98 (1984)). This publication clearly reveals that, during these reactions, the acidity of the zeolites is a determining factor in the speed of the reactions. The principal products obtained are feed isomers and/or hydrocracked products. The distribution of these two groups of products determines the total selectivity of the zeolites. At the level of oil refining, high yields of hydrocracked products indicate that the zeolitic catalyst possesses excellent properties for the dewaxing of lubricating oils. In this case, the waxy n-paraffins are transformed into lighter products (gas and gasoline components). When a high yield in isomers is obtained, the zeolitic catalyst can be used in applications aimed at lowering the pour point without losing the initial product as in the preceding case.

The process according to the present invention, in which a catalyst selected among zeolites with a high silica content, organosilicates, crystalline polymorphous silicas and zeolites deactivated by treatment with water vapor, is activated, by treating this catalyst thermally with aluminum chloride and an hydrohalic acid, is essentially characterized by the fact that aluminum chloride and hydrogen chloride, both in gaseous phase, are made to react with the catalyst, at a temperature between about 150° and 600° C. in the same reactor and the possible excess of gaseous hydrogen chloride is removed by means of an inert gas.

In a specific embodiment of the process according to the invention, a mixture of the catalyst and aluminum chloride introduced into the reactor is brought to the appropriate temperature to dehydrate the mixture in a stream of an inert gas, then a stream of an inert gas containing hydrogen chloride in the gaseous state is introduced into the reactor and the reactor is heated to a temperature of about 500° to 600° C. for several hours.

According to a feature of the process according to this invention, a stream of an inert gas containing gaseous hydrogen chloride is introduced into the reactor containing the dehydrated mixture of catalyst and aluminum chloride at a temperature of about 150° C. and the temperature of the reactor is raised to about 500° to 600° C. in the space of several hours during which the introduction of said gaseous stream containing hydrogen chloride is continued.

The stream of inert gas, such as nitrogen, advantageously contains about 20% dry gaseous hydrogen chloride.

EXAMPLES

The following examples illustrate the invention without limiting it:

EXAMPLE 1

Preparation, Use and Analysis of a Crystalline Silica (a) Preparation of a crystalline silica A crystalline silica, with an X-ray diffractogram identical to that of silicalite, was prepared, starting from the two following solutions:

solution 1: 5.3 g of NaOH in 20 ml of water; 5 g of $NH_4OH$ in 10 ml of water; 22 g of $SiO_2$ (aerosil); 800 ml of an aqueous solution 1N of tetrapropylammonium bromide;

solution 2: 500 g of glycerol.

Solution 1 was added to solution 2 by vigourously shaking and the mixture was heated in an autoclave at 150° C. for 3 days.

The obtained crystalline silica had, on an anhydrous base, the following molar composition: $(Al_2O_3)1$ $(SiO_2)5000$.

(b) Conversion of n-decane on the crystalline silica containing 1% metallic platinum 2 g of the crystalline silica obtained in the manner described above in (a) was saturated with 0.034 g of $Pt(NH_3)_4Cl$ in 2 ml of water. After drying and calcination at 500° C., 750 mg of the obtained powder were pressed, pulverized and sifted.

550 mg of the fraction of a particle size of 0.5 to 0.8 mm were loaded into a continuous flux tubular reactor, for the purpose of being used as a catalyst.

The catalyst loaded into the reactor was pre-reduced with hydrogen at 400° C. and cooled to 100° C. At this temperature, n-decane and hydrogen were passed over the catalyst in a molar ratio of $H_2/C_{10}H_{24}$ of 20 and an hourly spatial flow ratio of decane of 0.6 $h^{-1}$.

After 3 hours, the conversion in isomers and hydrocracked products was observed by gas chromatography in a column.

The temperature was than raised in steps of 10° C. and each time the composition of the effluent of the reactor was determined.

The curves of FIG. 1 of the attached drawings (in which the temperature of the reaction is indicated by the x-axis and the total conversion in % is indicated by the y-axis) show the obtained results. The degree of conversion of the n-decane upon contact with the catalyst of crystalline silica is indicated by a in FIG. 1. The content in feed isomer at different temperatures is shown by b in FIG. 1 and the quantity of hydrocracked products is indicated by c in FIG. 1.

(c) Analyses of the crystalline silica

The NMR spectrum $^{27}Al$ of the crystalline silica was determined in the following way:

0.5 g of the crystalline silica powder remaining from the present example 1(a) was loaded into the rotor of a high resolution NMR spectroscope of 400 MHz and the NMR spectrum $^{27}Al$ was recorded according to the magic angle spinning mode, using $Al(B_2O)_6{}^{+3}$ as reference. The resonance line $^{27}Al$ of the catalyst with a base of crystalline silica is shown in A in FIG. 4 of the attached drawings. The catalyst contained only a small quantity of tetrahedral aluminum (IV) and octahedral aluminum (VI).

The infra-red spectrum of the superficial OH groups of the crystalline silica was determined in the following way:

10 mg of the powder of crystalline silica remaining from the present example 1(b) were pressed to form a self-supporting wafer which was placed in suspension in the sample holder of an infra-red cell and degasified at 400° C. in a vacuum of $10^{-5}$ bar. The spectrum of the region of the hydroxy plate is shown in a of FIG. 5 of the attached drawings. It can be seen that there is only a weak OH band at 3600 $cm^{-1}$.

EXAMPLE 2

Activation of the Crystalline Silica of Example 1 by the Process According to the Invention and Use of this Activated Crystalline Silica (a) Activation process of the crystalline silica 1 g of the crystalline silica prepared in part (a) of Example 1 was ground with 0,1333 g of $AlCl_3.6H_2O$. The pulverized mixture was loaded into a continuous flux tubular reactor similar to that used in part (b) of Example 1. The mixture loaded in the reactor was heated to 500° C. under a stream of dry nitrogen at a rate of 60 ml/minute to dehydrate it, after which the load in the reactor was cooled to 150° C. At this stage, a gaseous stream containing 20% dry gaseous HCl in dry nitrogen was fed into the reactor that was heated to 550° C. in the space of 5 hours. During this entire period, the feeding of nitrogen containing HCl was continued.

The reactor was finally purged with dry nitrogen to eliminate the excess HCl and cooled. Activated crystalline silica was thus obtained.

(b) Conversion of n-decane on the activated crystalline silica saturated with 1% metallic Pt The activated crystalline silica obtained in part (a) of Example 2 above was used in the way described in part (b) of Example 1.

Figure 2:
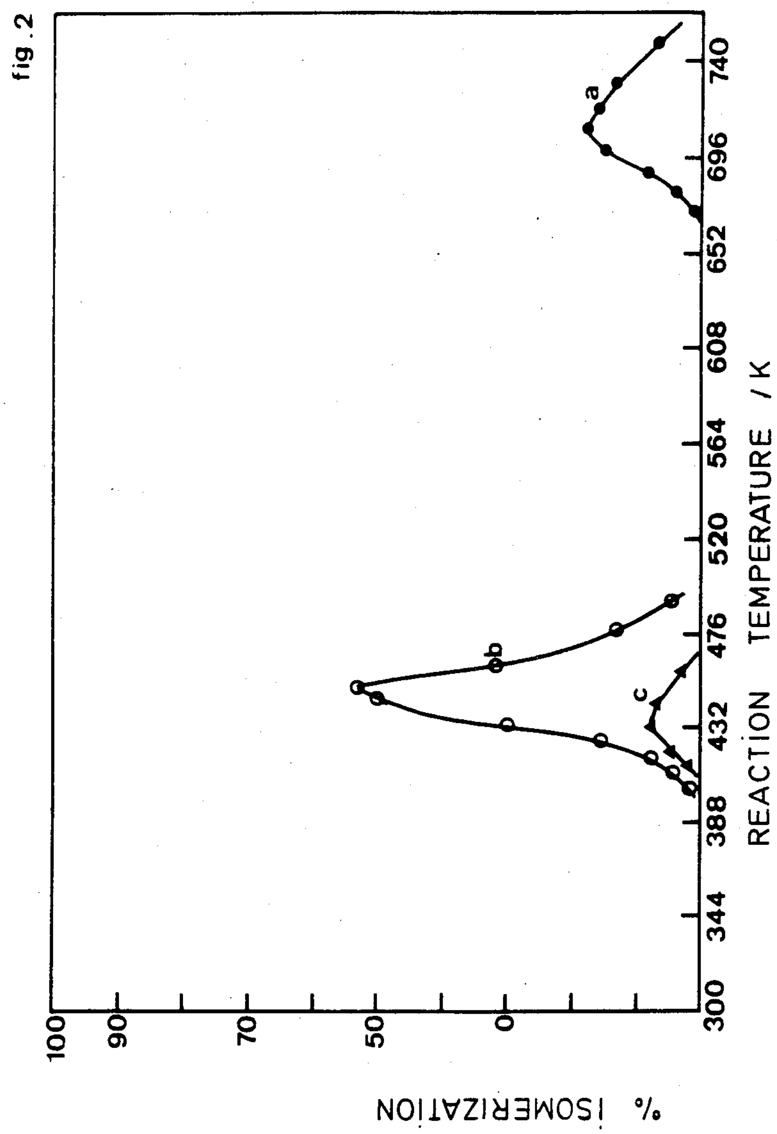
Figure 3:
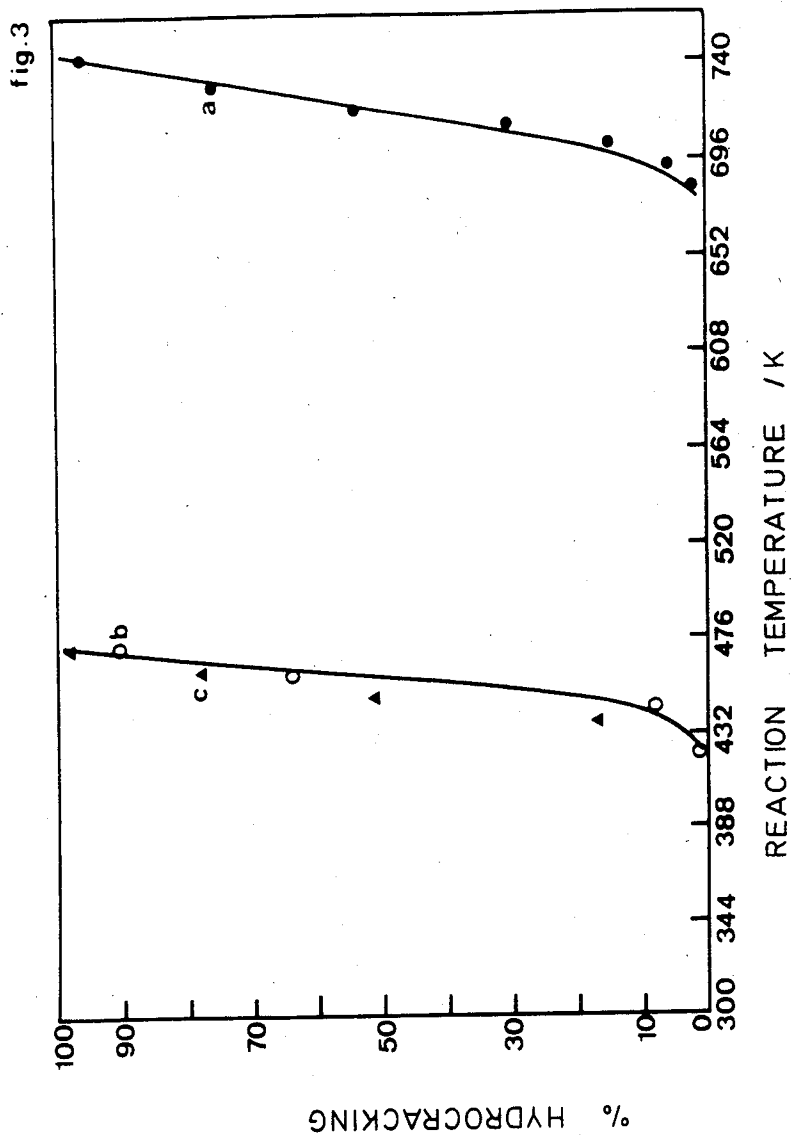

The b curves of attached FIGS. 1, 2 and 3 permit a comparison of the catalytic activity of the activated crystalline silica according to Exemple 2(a) with that of the non-activated crystalline silica according to Example 1(a).

This comparison reveals that the total conversion curve is moved to much lower temperatures, so that equivalent rates of conversion are obtained with the crystalline silica activated by the process of the invention (Example 2a) at temperatures 250° C. less than those applied with the non-activated crystalline silica.

It is the same, as one can see in FIGS. 1, 2 and 3, for the hydrocracking and isomerization activities of the non-activated crystalline silica and the crystalline silica activated according to the process of the present invention.

FIG. 2 reveals, in addition, that the maximum yields of isomers has increased from 19% (with the non-activated crystalline silica) to 50% (with the activated crystalline silica).

The following analyses to which was submitted the microcrystalline silica activated by the process according to the invention in Example 2(a) show the remarkable differences between the non-activated crystalline silica of Example 1(a) and the activated crystalline silica of Example 2(a).

Figure 4:
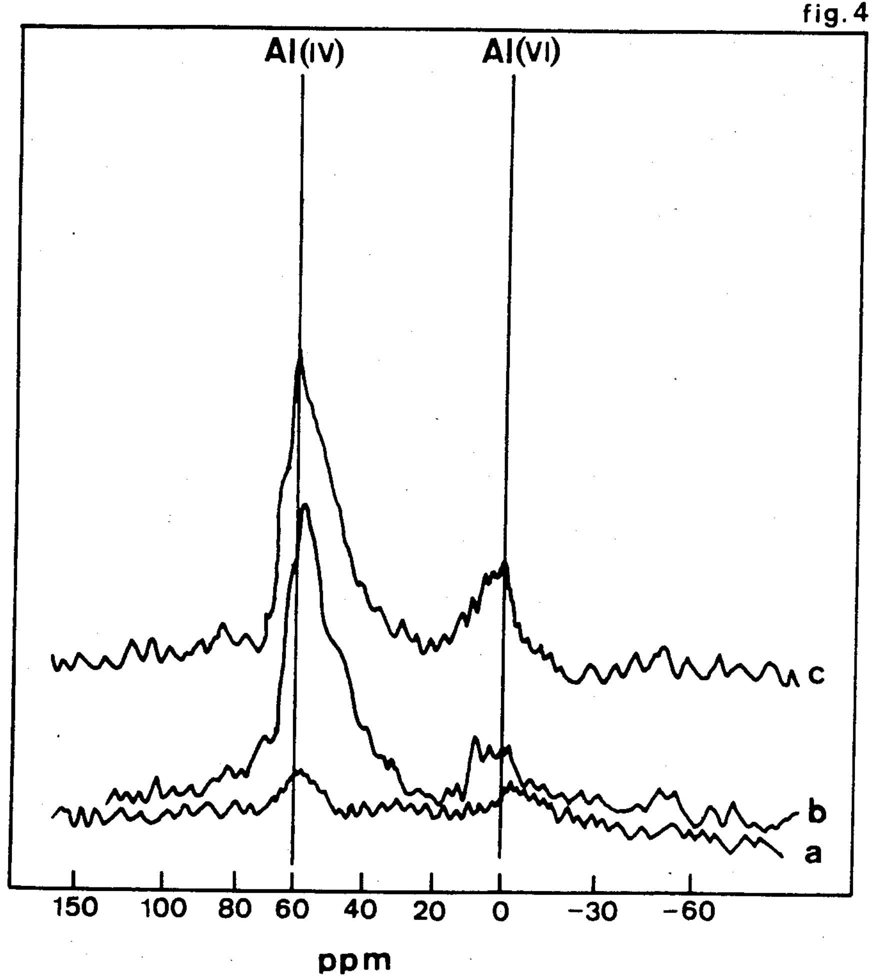

The NMR spectrum $^{27}Al$ of the activated crystalline silica of Example 2(a) determined in the manner described in Part c of Example 1, starting with 0.5 g of this activated crystalline silica, is shown in FIG. 4, graph b. This graph shows that the activated microcrystalline silica contains a significant quantity of tetrahedral aluminum.

Moreover, the infra-red spectrum of the superficial hydroxyl groups of the microcrystalline silica determined, by means of a sample of 10 mg of this silica, in the manner described in Part c of Example 1, shows (see curve b in FIG. 5) that the intensity of the absorption in the region of the OH groups at 3600 cm−1 has increased considerably, if it is compared to that obtained (see curve a in FIG. 5) from the non-activated microcrystalline silica prepared in Example 1(a).

EXAMPLE 3

Preparation, use and analysis of a reference zeolite of the ZMS-5 type with a molar ratio $SiO_2/Al_2O_3$ of 40

(a) Preparation of a reference ZMS-5 zeolite

A crystalline zeolite of the ZMS-5 type has been prepared by adding to the mixture of solutions 1 and 2 of Example 1(a) a third solution containing 1.2 g of $Al(NO_3)_3.9H_2O$ in 10 ml of water, by shaking vigorously. The obtained mixture was then treated in the manner described in Example 1(a).

The crystalline zeolite thus obtained possessed an X-ray diffractogram identical to the ZMS-5 zeolite and had the following molar composition:

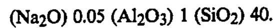

$(Na_2O)$ 0.05 $(Al_2O_3)$ 1 $(SiO_2)$ 40.

(b) Conversion of n-decane on the reference ZSM-5 zeolite 2 g of the ZSM-5 reference zeolite prepared in Part a of the present example were treated in the manner described in Example 1(b) and n-decane and hydrogen wee passed over the catalyst in the manner described in Example 1(b).

The c curves of FIGS. 1, 2 and 3 show the catalytic acitivity of the ZSM-5 reference zeolite catalyst prepared in Part a of this example.

An examination of FIGS. 1 and 3 shows that the ZSM-5 reference zeolite of the present example and the crystalline silica activated by the process of the invention (see Example 2(a)) have the same catalytic activity (curves b and c) in terms of the rate of total conversion of the n-decane (FIG. 1) and the rate of hydrocracking (FIG. 3).

However, by comparing curves b and c of FIG. 2, it can be seen that in terms of the rate of isomerization, the catalytic activity of the ZSM-5 reference zeolite (Curve c) is clearly less than that of the crystalline silica activated (curve b) by the process according to the invention (Example 2a).

This comparison shows that when the activation process according to this invention is applied to a crystalline silica with an x-ray diffractogram similar to that of a zeolite of the ZSM-5 type, an activated crystalline silica is obtained whose catalytic properties are greater than those of a ZSM-5 zeolite in which the molar ratio $SiO_2/Al_2O_3$ is 40.

Figure 5:
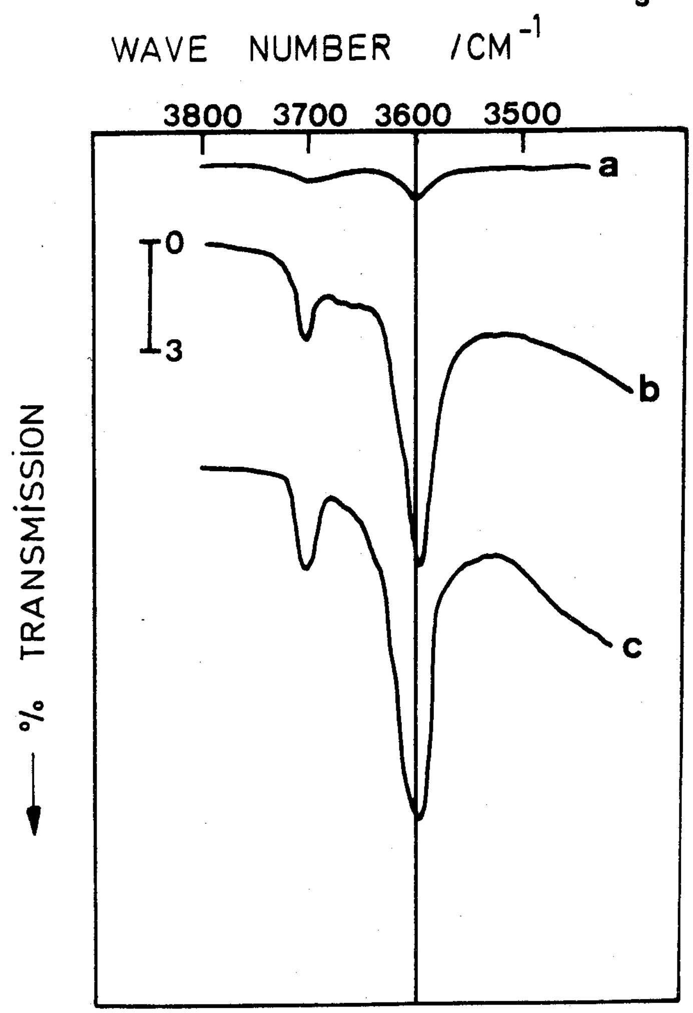

These observations are all the more surprising as the NMR spectrum $^{27}Al$ and the infra-red spectrum of the superficial OH groups of the cited reference ZSM zeolite, shown by curves c in FIGS. 4 and 5 are the same as those (b curves) of the activated crystalline silica obtained by the process of the invention (Example 2a), the NMR and IR spectra of the reference ZSM-5 zeolite having been determined respectively from 0.5 to 10 mg of this ZSM-5 zeolite by operating exactly in the manner described in Part c of Example 1.

EXAMPLE 4

Preparation, activation, use and analysis of a zeolite of the ZSM-5 type with a ratio $SiO_2/Al_2O_3$ of 250

(a) Preparation of the ZSM-5 zeolite

A ZSM-5 zeolite with a molar ratio $SiO_2/Al_2O_3$ of 250 was prepared in the manner described in Example 3(a), with the exception that 0.2 g (instead of 1.2 g) of $Al(NO_3)_3.9H_2O$ in 10 ml of water was used as the third solution.

(b) Activation of the ZSM-5 zeolite with a ratio $SiO_2/Al_2O_3$ of 250

1 g of the ZSM-5 zeolite prepared as described in Part a of the present example was activated by the process of the invention, in the manner described in Example 2(a).

(c) Use of the ZSM-5 zeolite of Example 4(a) and of the activated ZSM-5 zeolite of Example 2(b)

These two zeolites were each treated separately at described in Example 1(b) and used as catalysts for the conversion of n-decane in the manner also described in Example 1(b).

Figure 6:
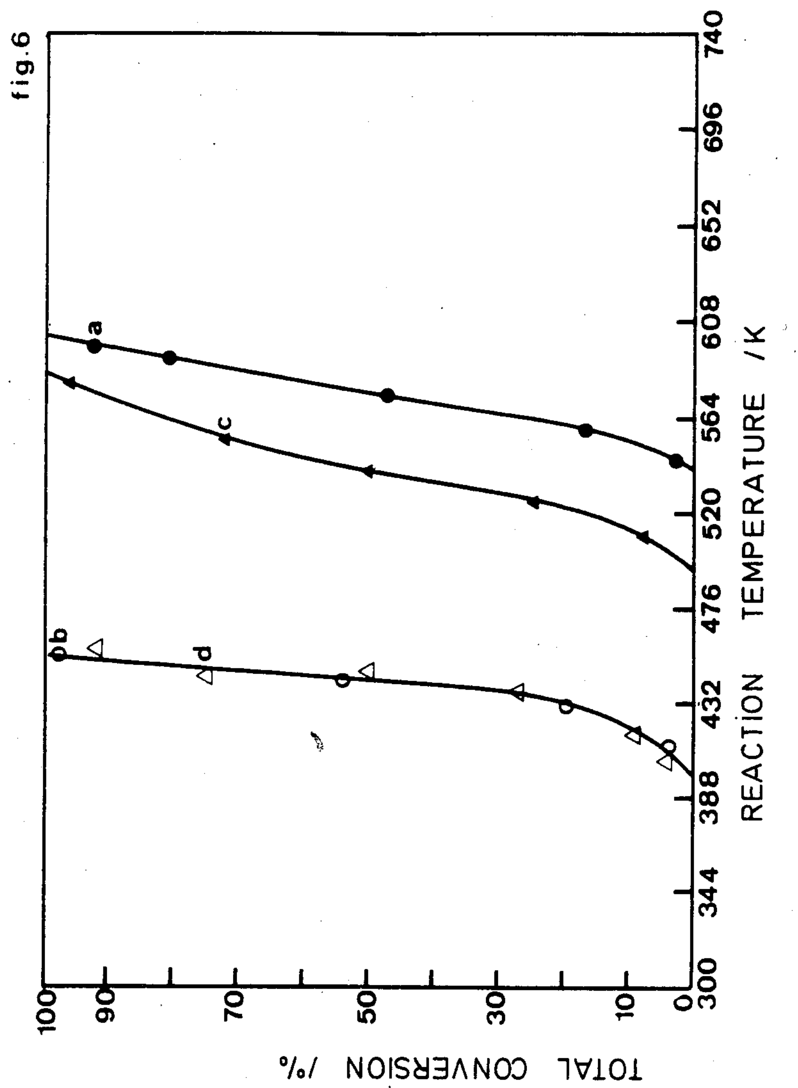

The rate of total conversion of n-decane is shown for the non-activated ZSM-5 zeolite catalyst, ($SiO_2/Al_2O_3=250$) and for the same catalyst activated by the process of the invention by the curves of FIG. 6. Curve a of FIG. 6 is that for the non-activated zeolite catalyst, while curve b is for the same zeolite catalyst activated by the process according to the invention. FIG. 6 shows clearly that the catalytic activity of the ZSM-5 zeolite was considerably increased by the activation.

By comparing curve b of FIG. 6 to curve c of FIG. 1 (these curves are identical), it is observed that a ZSM-5 zeolite with an initial molar ratio $SiO_2/Al_2O_3$ of 250 possesses, after activation by the process according to the present invention (Example 4b), the same catalytic activity as a ZSM-5 zeolite with a ratio $SiO_2/Al_2O_3$ of 40, that is a much lower ratio.

EXAMPLE 5

Activation of a ZSM-5 zeolite by the process of U.S. Pat. No. 4,438,215 and use of this activated zeolite (a) Activation of the ZSM-5 zeolite The ZSM-5 zeolite prepared in Example 4(a) was activated by the process described in U.S. Pat. No. 4,438,215, as follows:

1 g of the above-mentioned ZSM-5 zeolite was mixed with 0.133 g of $AlCl_3.6H_2O$. The obtained mixture was then treated in a stream of dry nitrogen at 500° C., then purged at this temperature, cooled, hydrolyzed with 50 ml of water, dried in air and calcined again at 540° C.

(b) Conversion of n-decane on the ZSM-5 zeolite catalyst activated by the process described in U.S. Pat. No. 4,438,215

It was processed exactly in the same way as with the crystalline silica in Example 1(b).

Curve c of FIG. 6 shows the catalytic activity for the conversion of n-decane.

By comparing on FIG. 6 the relative activities of the non activated ZSM-5 zeolite (Curve a of FIG. 6), of the same ZSM-5 zeolite activated by the process of U.S. Pat. No. 4,438,215 (Curve c of FIG. 6) and of the same ZSM-5 zeolite activated by the process of the present invention (Curve b of FIG. 6), it can be seen that the ZSM-5 zeolite activated in accordance wxith the present invention (Example 5a) presents a clearly better catalytic activity.

Since, in the process according to U.S. Pat. No. 4,438,215, the hydrolysis of the mixture constitutes a key step in the process of activation of the zeolites, a test aimed at determining if, in the process of the present invention, an hydrolysis phase permitted a greater increase in the catalytic activity of the zeolites was performed.

For this purpose, the ZSM-5 zeolite activated in the manner described in Example 5(a) (according to the present invention) was hydrolyzed in 50 ml of water at room temperature.

The catalytic activity of the activated ZSM-5 zeolite thus hydrolyzed was determined by using this last zeolite for the conversion of n-decane in the manner described in Example 1(b).

Curve d of FIG. 6 shows the catalyst activity of the activated and hydrolyzed ZSM-5 zeolite. This curve d is the same as curve b with respect to the catalytic activity of the same activated ZSM-5 zeolite, but not hydrolyzed (Example 5b). This shows that the phase of hydrolysis in water of the activated zeolite is not useful, since it does not improve the catalytic effect of the activated zeolite.

EXAMPLE 6

Activation of a zeolite previously deactivated and comparison of catalytic activities (a) Deactivation of a ZSM-5 zeolite The reference ZSM-5 zeolite prepared in Example 3(a) was used for converting methanol into gasoline.

For this purpose, methanol was passed over 3 g of the catalyst (reference ZSM-5 zeolite) in the tubular reactor of Example 1(b) at 500° C. and at a HSLV rate of 20 $h^{-1}$. The conversion of the methanol was initially of 100%. After 150 hours of use, the catalyst was completely deactivated, the conversion of the methanol having decreased to only 12%

The catalyst was then removed from the reactor and calcined in air at 600° C.

(b) Conversion of n-decane with the deactivated catalyst

A first fraction of the deactivated reference ZSM-5 catalyst was saturated with a platinum salt and used for the conversion of n-decane in the manner described in Example 1(b).

Figure 7:
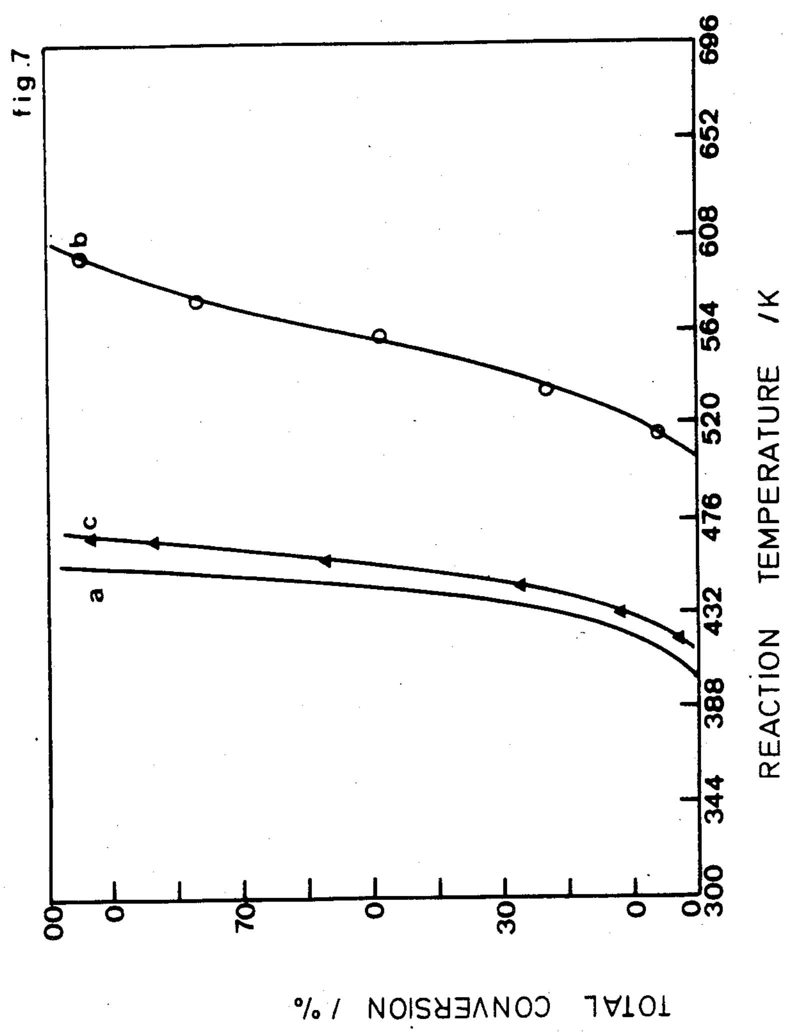

Curve b of FIG. 7 shows the catalytic activity of the above deactivated catalyst, in terms of the rate of total conversion of the n-decane, as a function of temperature.

In FIG. 7, Curve a shows, as a comparison, the base activity of the reference ZSM-5 catalyst.

(c) Activation of the ZSM-5 zeolite catalyst by the process of the invention

A second fraction (1 g) of the deactivated and calcined reference ZSM-5 catalyst was reactivated by the process of this invention, by mixing it with 0.050 g of $AlCl_3.6H_2O$ and by heating the mixture in a stream of nitrogen containing hydrogen chloride, as described in Example 2(a).

(d) Conversion of n-decane with the reactivated catalyst obtained in c

The reactivated catalyst obtained in c of the present example was used to convert n-decane in the manner described in Example 1(b).

Curve c of FIG. 7 shows the catalytic activity expressed by the rates of total conversion of n-decane as a function of temperature.

The comparison of curves a, b, and c of FIG. 7 shows that the initial activity of a ZSM-5 zeolite deactivated by the reaction of conversion of methanol into gasoline cannot be completely regenerated by eliminating the coke formed on the catalyst in the conventional way, by calcination, whereas such a regeneration is possible by the process according to this invention.

EXAMPLE 7

Preparation, activation and use of a ZSM-1 zeolite 900

To a solution of sodium silicate containing 10.68% of $Na_2O$, 27.72% of $SiO_2$ and 61.60% of water, 2.1 g of tetrabutylphosphonium chloride dissolved in 38 ml of water were added.

To the obtained solution were added successively and by shaking vigorously 0.02 g of sodium aluminate dissolved in 50 g of water and 1 ml of concentrated sulfuric acid.

The obtained gel was heated at 160° C. for 24 hours in an autoclave.

The obtained solid material, presenting the X-ray diffractogram of the ZSM-11 zeolite, was washed in water, dried, calcined at 550° C., cooled to room temperature and heated in reflux in a hundredfold excess (100×) of a 1 molar solution of ammonium actate.

The obtained ZSM-11 zeolite had a molar ratio $SiO_2/Al_2O_3$ of 500.

(b) Activation of the ZSM-11 zeolite 1 g of the ZSM-11 zeolite prepared as described above was obtained by the process of the invention, under the operating conditions described in Example 2(a).

(c) Conversion of n-decane with non activated and activated ZSM zeolite

The non-activated ZSM-11 zeolite catalyst prepared in (a) and the activated ZSM-11 zeolite catalyst as described in (b) were used for the conversion of n-decane, according to the operating conditions described in Example 1(b).

It was observed, during these tests, that the reaction temperature at which 50% of the n-decane was transformed, was 247° C. during the use of the non activated ZSM-11 zeolite catalyst and 177° C. during the use of the same catalyst activated in the manner described in (b) in the present example.

These observations indicate that the activation process according to the present invention considerably increases the catalytic activity for the conversion of the n-decane, since the temperature at which 50% of the n-decane is converted is 70° C. lower with the activated ZSM-11 zeolite than the temperature necessary with the same non-activated zeolite.

EXAMPLE 8

Preparation, activation and use of a ZSM-48 zeolite (a) Synthesis of a ZSM-48 zeolite with a ratio $SiO_2/Al_2O_3$ of 450

To 20 g of the solution of the sodium silicate of Example 7(a), were added successively, by shaking vigorously, 4.2 g of tetramethylammonium bromide, 1 g of concentrated sulfuric acid and 0.04 g of $Al(NO_3)_3.9H_2O$ in 20 ml of water.

The obtained gel was heated at 150° C. in an autoclave for 2 days and the solid obtained material, which had the diffractogram of the ZSM-48 zeolite, was then treated in the manner described in Example 7(a).

(b) Activation of the ZSM-48 zeolite 1 g of the ZSM-48 zeolite prepared in (a) was activated by the process according to the invention, under the condition and following the operating method described in Example 2(a).

(c) Conversion of n-decane over non-activated and activated ZSM-48 zeolite

Comparative tests of conversion of n-decane over non-activated ZSM-48 zeolite and over the same zeolite activated as described in (b) in the present example have been made.

These tests showed that the temperature at which 50% of n-decane are converted are respectively 267° C. with the non activated ZSM-48 and 217° C. with the activated ZSM-48. This demonstrates that the process of the invention also permits the activation of the catalysts of the ZSM-48 type having a high silica content.

EXAMPLE 9

Activation of a zeolite treated with water vapor 2 g of the reference ZSM-5 zeolite prepared in Example 3(a) were treated with water vapor under 1 atmosphere at a temperature of 750° C.

The zeolite treated with vapor was then prepared to act as catalyst and it was tested in a test of conversion of n-decane under the conditions described in Example 1(b).

The temperature at which 50% of the n-decane were converted was 210° C.

Another fraction of the same zeolite treated with water vapor was activated by the process of this invention, by operating in the way described in Example 2(a) for the crystalline silica.

The activated zeolite obtained was submitted to a test of use as catalyst for the conversion of n-decane under the conditions described above (Example 1b).

The temperature at which 50% of the n-decane were converted over the reference ZSM-5 zeolite catalyst treated with vapor and activated according to the present invention was 175° C.

It can thus be seen that the process according to the invention also permits a substantial activation of zeolites previously deactivated by treatment with water vapor.

What we claim is:

1. A process for activating and introducing aluminum into the framework of catalysts selected from the group consisting of zeolites with a high silica content, organosilicates, crystalline polymorphous silicas and zeolites deactivated by treatment with water vapor, in which a catalyst of this type is treated thermally with aluminum chloride and an hydrohalic acid, the improvement comprising reacting the catalyst with aluminum chloride and hydrogen chloride, both in gaseous phase, at a temperature between about 150° and 600° C. in the same reactor and then removing any excess of gaseous hydrogen chloride by means of an inert gas.

2. A process according to claim 1, in which a mixture of catalyst and of aluminum chloride introduced into the reactor is brought to the suitable temperature for dehydrating the mixture in a stream of inert gas containing hydrogen chloride in the gaseous state and the reactor is heated to a temperature of about 500° to 600° C. for several hours.

3. A process according to claim 2, comprising the grinding of the catalyst with aluminum chloride to form a homogeneous mixture that is introduced into the reactor.

4. A process according to claim 1, comprising the steps of introducing a stream of inert gas containing gaseous hydrogen chloride into the reactor loaded with the dehydrated mixture of catalyst and of aluminum chloride at a temperature of about 150° C. and raising the temperature of the reactor to about 500° to 600° C. within several hours during which one continues to introduce into the reactor the above gaseous stream containing hydrogen chloride.

5. A process according to claim 1 or 4, in which the stream of inert gas containing gaseous hydrogen chloride contains about 20% dry gaseous hydrogen chloride.

6. A process according to claim 1, in which nitrogen is used as the inert gas.

7. A process according to claim 1, in which the reactor is heated to a temperature of 500° to 600° C. in the space of about 5 hours during which the stream of inert gas containing gaseous hydrogen chloride is passed through the load of catalyst and aluminum chloride.

8. A process according to claim 1, in which a gas continuous flux tubular reactor is used.

* * * * *